Sept. 25, 1956
R. W. RUMBLE
2,763,911
COMPOSITE STRUCTURES SUCH AS SHUTTERING FOR
CONCRETE OR AS PARTS OF BUILDINGS COMPOSING
A NUMBER OF PANEL ELEMENTS
Filed Feb. 3, 1953
2 Sheets-Sheet 1
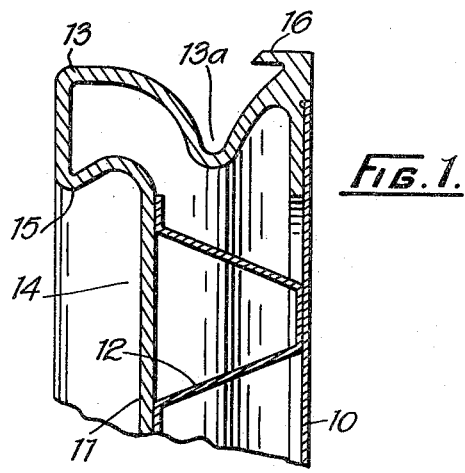
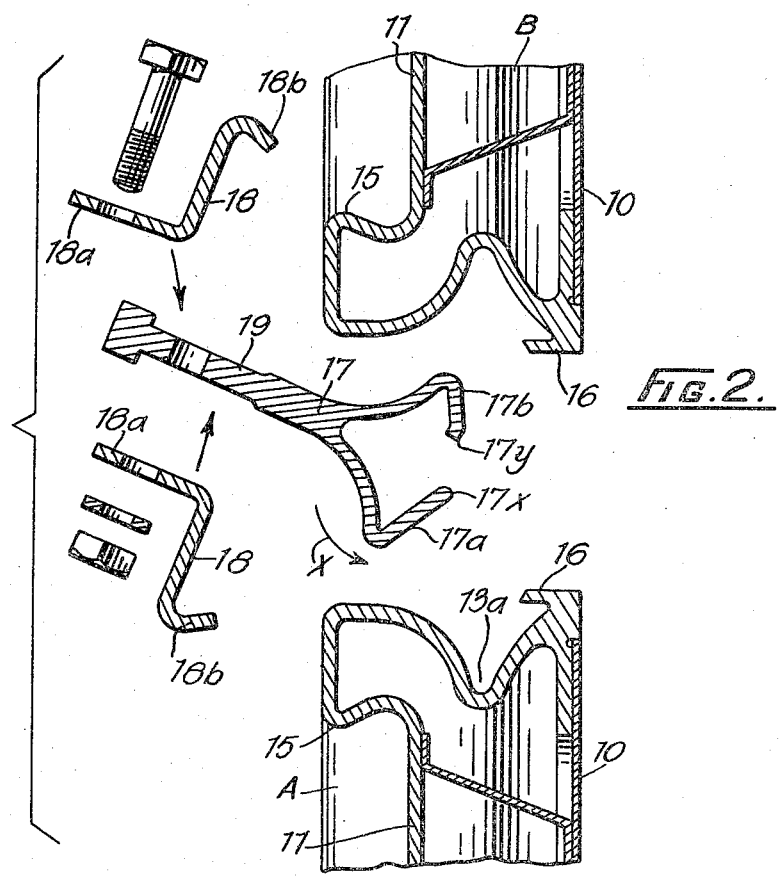

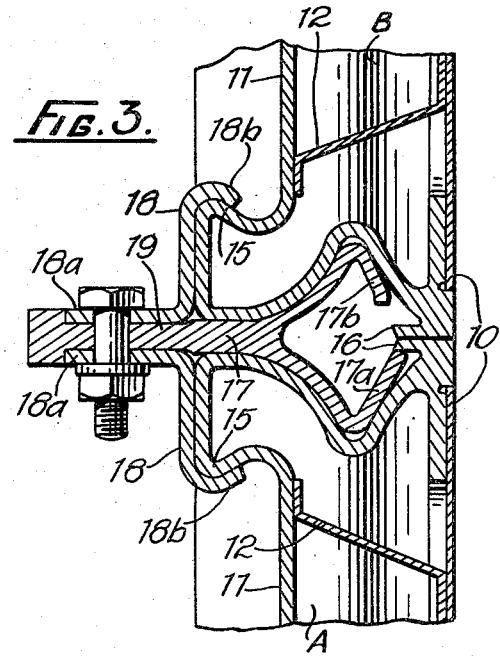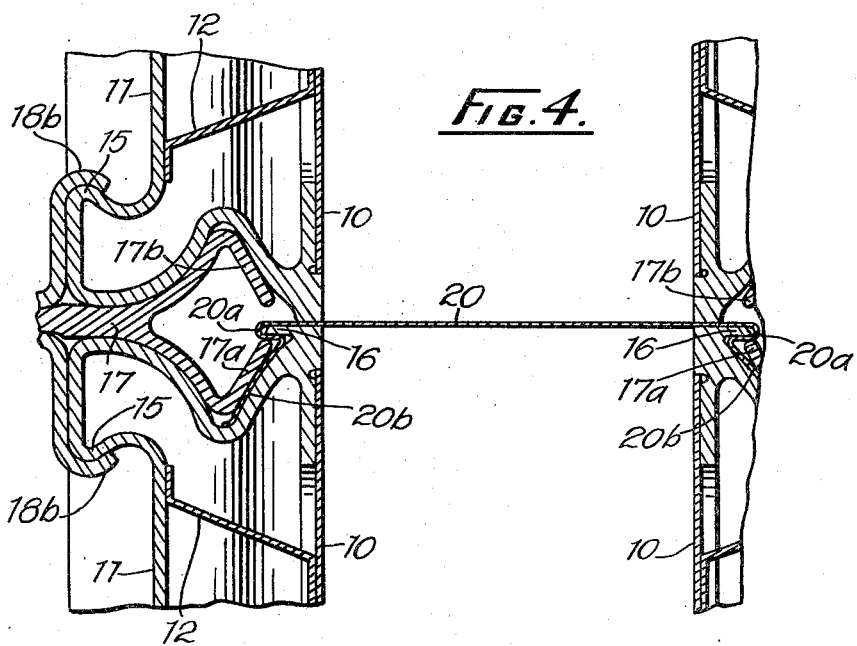

United States Patent Office 2,763,911
Patented Sept. 25, 1956

2,763,911

COMPOSITE STRUCTURES SUCH AS SHUTTERING FOR CONCRETE OR AS PARTS OF BUILDINGS COMPOSING A NUMBER OF PANEL ELEMENTS

Roy W. Rumble, Germiston, Transvaal,
Union of South Africa

Application February 3, 1953, Serial No. 334,813

9 Claims. (Cl. 25—131)

This invention relates to composite structures for use in building, of the kind comprising a number of panel units each having its length and width materially greater than its thickness, so that the external surfaces defined by width and length may be regarded as faces and those in which thickness is a dimension may be regarded as edges; one of the faces being a rectilinear face which for the purpose of this specification is regarded as the principal face; the other face being regarded as the secondary face; and the units being assembled to provide a common rectilinear face. By a "rectilinear" face is meant a face of which at least one superficial dimension is rectilinear; so that a rectilinear face is plane when its other superficial dimension is rectilinear. The term as used here includes cylindrical or cylindroidal surfaces of small curvature.

A composite structure of the kind referred to has several uses; for example use as shuttering for moulding concrete mix in situ, or as a portion of a building, such as a wall. The composite structure is usually required to be capable of easy disassembly to recover its individual panels and other units.

In a composite structure of the kind referred to and to which the invention relates, the panels are formed at least at two parallel edges with grooves parallel with those edges. They are assembled grooved edge to grooved edge; and the present invention refers to the edge formations by which such edgewise assembly is effected.

Applicant's Patent No. 2,447,670 describes a method of assembling the panels to form a wall. Briefly the method consists in including in the cavity defined by juxtaposed edges of adjacent panels, and more especially the horizontal joints, waling members that cross the joints. The cross-sectional forms of the waling members and the panel edges are such that the members and panels interengage to resist displacement in the direction transverse to and away from the principal face of the assembly. The waling members are engaged between the panels by relative rotary movement initiated by engagement of hook formations that constitute a pivot about which the relative rotary movement takes place. Often the interengagement is a resilient one which imposes on the waling member at least, a slight deformation that assists to lock the interengaged parts together.

A wall assembled in this manner is characterised by a high resistance to displacement by forces acting on the principal face which, in the case of shuttering, is the moulding face. Thus twin walls defining a moulding cavity are well suited to resist the bursting pressure of plastic concrete in the cavity, especially if the walls are strapped together at intervals by sheet metal cross ties the extremities of which are sandwiched in the joints between adjacent panels and are to this end shaped complementally to the common cross-sectional form of the panel edges and waling members.

However, the walls have little resistance to displacement by forces acting transversely to, but away from, the principal face. In a partition wall this would be a disadvantage, and there are occasions, which will be noted hereinafter, when this unidirectional rigidity is disadvantageous when the assembly of panels is used as shuttering.

The main object of this invention is to provide a modified structure that is resistant to displacement in both horizontal directions normal to the faces of the assembly.

According to the invention, at least one of the two juxtaposed grooved edges has a lip that projects away from the principal face of the panel to constitute a hook formation overhanging the groove. The hook formation provides a pivoting point for the waling member, which is engaged with the panel edge by relative rotary movement about the pivoting point.

Desirably, the lip is co-extensive with the panel and perpendicular to its principal face.

The invention provides also composite structures consisting in a panel for use in building, providing a principal face that is rectilinear, and adapted to be assembled edge to edge with other similar panels to provide a common rectilinear face; each of two parallel edges at least being formed with a groove parallel with the edge and shaped to define between juxtaposed panels a cavity adapted to accommodate a complementally shaped waling member; at least one of the two juxtaposed grooved edges having a lip that projects away from the principal face of the panel to constitute a hook formation overhanging the groove.

In an alternative construction, the lip occurs at both the juxtaposed panel edges and the waling members are formed to engage one lip only.

Usually, the assembly of panels will be vertical and the engaged tip and lip are associated with the lower panel to permit the waling member and afterwards the upper panel to be brought into position by rotary movement.

The assembly is stable against displacement by forces acting from the rear of the wall, without additional structure. Rigidity against forces acting in the opposite direction is obtained by fastening means that clamp the walng member to the rear faces of the panels. Such means may consist in a hook formation on the waling member which grips a rim provided by the panel, as disclosed in the specification of applicant's Patent Number 2,447,670, but in this case the hook is detachable from the member and is brought into position after the member is engaged with the panel.

Embodiments of the invention are illustrated in the accompanying drawings in which Figure 1 is a section through part of a panel made according to the invention;

Figure 2 is a sectional "exploded" view showing two panels in the process of assembly;

Figure 3 is a sectional view of the assembled panels; and

Figure 4 is a view similar to Figure 3 of a modified assembly.

In Figure 1 the panel includes a rectilinear face plate 10 which is the principal face, and a back plate 11 united to the face plate by structure such as a corrugated sheet 12 as well as by an edge formation 13 on all four sides of the panel and that includes at least along each of two parallel edges a groove 13a co-extensive with the edge.

The back plate 11 is recessed at 14 to provide a peripheral rim 15.

At least one of the edges 13 is formed with a lip 16 that projects away from the and at right angles to face plate 10 and overhangs the groove 13a so that it constitutes a hook formation.

Two identical panels A, B are shown in Figures 2 and 3. In order to assemble them grooved edge to grooved edge, a waling member 17 is brought into engagement with the panel A (which when the panels are vertical is the lower panel) by rotary movement of the waling member 17, as indicated by the arrow X.

The body of the waling member consists in two trough-shaped elements 17a, 17b which constitute opposed tongues conforming to the shape of the grooves 13, the tips 17x and 17y of the tongues being spaced apart.

During the engagement of the waling member with the panel A, the tip 17x of the tongue 17a is engaged under the lip 16, and the waling member is rolled into the groove 13a.

The waling member is then fastened to the panel by fastening means consisting in two Z-shaped elements 18 the limbs 18a of which are formed to be bolted to a shank 19 integral with the tongues 17a, 17b and projecting rearwardly beyond the back plate 11. The lower limb 18b of the element is hooked over the peripheral rim 15 and the elements bolted to the shank 19.

The panel B is then engaged with the waling member 17 by tilting the panel, hooking its rim 15 under the upper limb 18b and rotating the panel about the line of engagement between its rim 15 and the limb 18b until the face 10 comes into line with the face 10 of the panel A.

If both panels have lips 16, as is the case in Figures 2 and 3, the tip 17y of the tongue 17b must be displaced backwards from the horizontal plane including the tip 17x of the tongue 17a to prevent it from fouling the lip of the panel B. In Figure 4, however, only one edge of each panel has a lip 16. The lipped edge, in a vertical wall, will be the upper horizontal edge of each panel; and as the juxtaposed edge of the panel above it has no lip the tip of tongues 17b need not be displaced from that of the tongue 17a, so that the waling member may be symmetrical and therefore reversible.

Apart from the uses noted above, the panels of the invention may advantageously be used with cross ties such as that shown in Figure 4 at 20 that have ends formed complementally to the cross-sectional shape of the panel edge, i. e. with a hook consisting in a kink 20a that fits around the lip 16 of the lower panel and has a tail 20b that is overlain by the waling member 17. A tie of this sort is very highly resistant against withdrawal under high bursting pressures.

The waling member 17, when engaged with the panels as described, gives to the assembly rigidity in all directions; and is therefore particularly suitable to align and stiffen the uppermost row of panels of a wall, which have no panels above them to hold a waling member in place.

I claim:

1. A panel for use in building, providing a principal face that is rectilinear, and adapted to be assembled edge to edge with other similar panels to provide a common rectilinear face; each of two parallel edges at least being formed with a groove parallel with the edge and shaped to define between juxtaposed panels a cavity adapted to accommodate a complementally shaped waling member; at least one of the two juxtaposed grooved edges having a lip that projects away from the principal face of the panel to constitute a hook formation overhanging the groove.

2. The panel claimed in claim 1 in which the lip is co-extensive with the panel.

3. The panel claimed in claim 1 in which the lip is perpendicular to the principal face of the panel.

4. A composite structure consisting in a series of panels assembled edge to edge to provide a principal face that is continuous and rectilinear and a rear face, at least some of the pairs of juxtaposed edges being formed with opposed grooves that are parallel with the edges; waling members each comprising a body contained within the cavity defined by the opposed grooves and a shank that projects outwardly from the rear face; the members crossing the joints of the assembled structure that are transverse to the members; a lip, on an edge of each pair of juxtaposed grooved edges, that projects away from the principal face to constitute a hook formation that overhangs the groove; an element provided by each waling member that butts against the lip overhanging the cavity in which the member is contained; and means detachably to fasten the shank to the panels to each side of it.

5. The structure claimed in claim 4 in which both edges of each pair of juxtaposed grooved edges provide lips and in which the waling members are constructed for the element of each to engage one lip only of each pair of lips.

6. The structure claimed in claim 5 in which the body of each waling member consists in a pair of opposed trough-shaped tongues substantially complemental to the grooves in the panel edges, the tips of the tongues directed towards the principal face of the structure and being spaced apart with one tip forward of the other in planes parallel with the principal face.

7. A composite structure consisting in a series of panels assembled edge to edge to provide a principal face that is continuous and rectilinear and a rear face at least some of the pairs of juxtaposed edges being formed with opposed grooves that are parallel with the edges; waling members each comprising a body contained within the cavity defined by the opposed grooves and a shank that projects outwardly from the rear face; the members crossing the joints of the assembled structure that are transverse to the members; a lip, on an edge of each pair of juxtaposed grooved edges, that projects away from the principal face to constitute a hook formation that overhangs the groove; an element provided by each waling member that butts against the lip overhanging the cavity in which the member is contained; the rear face of each panel being centrally recessed to form a peripheral rim; and hook-shaped elements engaging the rim and detachably secured to the projecting shanks of the waling members.

8. The combination of claim 6 in which the hook-shaped elements are Z-shaped in cross section, one limb of the Z providing the hook and the other constituting a flange that is secured to the projecting shank of the waling member.

9. A composite structure including two parallel walls spaced apart, each consisting in a series of panels assembled edge to edge to provide a principal face that is continuous and rectilinear and a rear face; at least some of the pairs of juxtaposed edges being formed with opposed grooves that are parallel with the edges; waling members each comprising a body contained within the cavity defined by the opposed grooves and a shank that projects outwardly from the rear face; the members crossing the joints of the assembled structure that are transverse to the members; a lip, on an edge of each pair of juxtaposed grooved edges, that projects away from the principal face to constitute a hook formation that overhangs the groove; an element provided by each waling member that butts against the lip overhanging the cavity in which the member is contained; means detachably to fasten the shank to the panels to each side of it; and cross ties spanning the gap between the two walls, each tie having at one end a head that is contained within the joint between juxtaposed panels and provides a hook which accommodates the lip.

References Cited in the file of this patent

UNITED STATES PATENTS

| | | |
|---|---|---|
| 1,077,702 | Grant | Nov. 4, 1913 |
| 1,863,549 | Lockwood | June 14, 1932 |
| 2,447,670 | Rumble | Aug. 24, 1948 |